Feb. 14, 1939.   F. J. KELLY   2,147,444
ARTIFICIAL BAIT OR DECOY PLUG
Filed Jan. 21, 1938
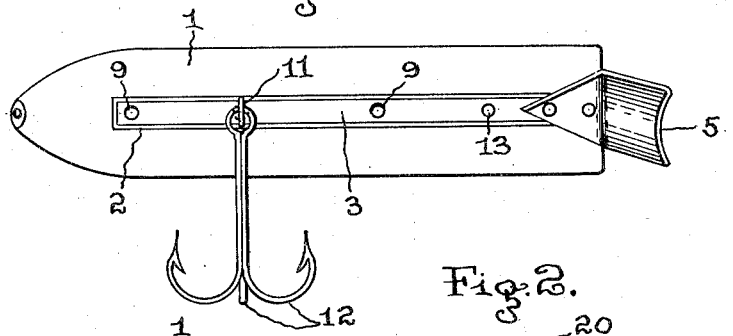
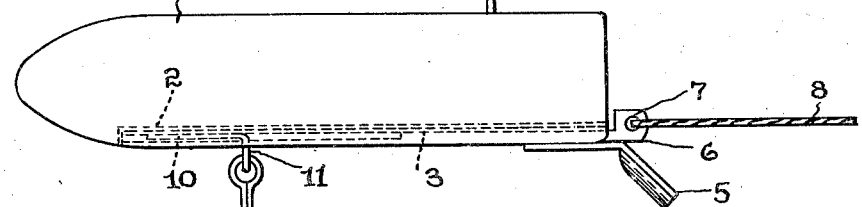
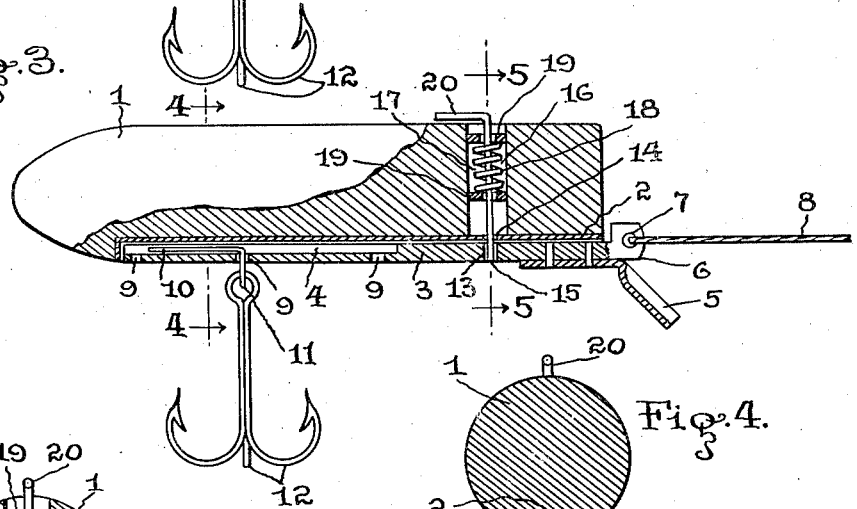
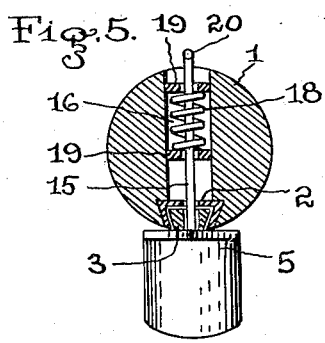
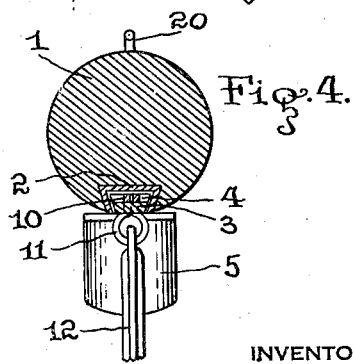
INVENTOR
FRANK J. KELLY
BY
Clarence S. Ashley
ATTORNEY Patented Feb. 14, 1939

2,147,444

UNITED STATES PATENT OFFICE 2,147,444

ARTIFICIAL BAIT OR DECOY PLUG

Frank J. Kelly, Brooklyn, N. Y.

Application January 21, 1938, Serial No. 186,261

1 Claim. (Cl. 43—46)

The invention relates to improvements in artificial bait or decoy plugs employed as lures in game and other forms of fishing.

The object of the invention resides in the providing of a lure body of any suitable material and having any suitable contour or form having countersunk therein a reception channel member having associated therewith means depicting the outline and form of a live bait. The lure body is grooved throughout part of its length and apertured at intervals to receive a detachable, single or cluster of fish hooks, said body having disposed therein at its rear portion a spring controlled plunger clip for engagement with an aperture in the reception channel therefore. The structure is provided with means for locking the relative parts thereof as a unit, the detachable member thereof being the anchoring device for the hooks mounted thereon, the end of said member being provided with means for attaching to said decoy lure body the end of a snare or fish line.

In the following there is described the general embodiment of the invention, the features thereof being more fully and clearly defined hereinafter in the claim forming part hereof.

In the drawing Fig. 1 is a perspective view of the decoy lure, showing a group assemblage of hooks mounted therein; Fig. 2 is side elevation of the lure; Fig. 3 is a longitudinal sectional view of the lure, part being in elevation to more clearly define the relative position of parts thereof; Fig. 4 is a cross section on the line 4—4 of the body of the lure showing the hook anchoring means therefor; and Fig. 5 is a cross sectional view on line 5—5 of Fig. 3 showing the locking means for securing the fin member in the reception channel of said lure.

Similar numerals of reference indicate similar and like parts throughout the several views of the drawing.

In the drawing 1 designates a lure body of any material and of a predetermined form, the under belly portion thereof being grooved and having embedded therein a channel member 2. 3 indicates a movable member which is channeled at 4 and has at its rear end a tail-like member 5 and lug 6 provided with an aperture to which the end of the fish line or snare 8 is attached. Said fin 3 has formed therein apertures 9 spaced at regular intervals therein to receive the bent staple end 10 of the eye 11, said eye 11 thereof having fulcrumed or otherwise mounted therein a single or cluster of fish hooks 12. Said fin 3 has cut therein a hole 13 in alignment with a hole 14 in channel piece 2, both apertures thereof being arranged to receive the end of pin 15 of snap lock 16, the latter being disposed in a chamber 17 in body 1 of the lure and the engaged and disengaged position thereof being controlled by means of expansion spring 18 housed between collars 19 on pin 15, the upper end thereof being bent at a right angle to the axis of said pin to form a handle 20 therefor.

The structure as a bait lure may be made of any suitable material colored or decorated to simulate an animated object or carved in the form of live bait, and in use provide a very serviceable and safe type of an artificial bait to use and handle, since the snap lock may be actuated to release the fin member thereof which, when it is removed from the lure body, carries with it the hook or cluster of hooks thereby making it simple and easy to detach a fish from the hook without in any way injuring the catch or harming in any way the angler's hands, etc.

It is obvious that the structure may be varied in many ways without departing from the spirit of the invention.

What I claim and desire to secure by Letters Patent of the United States is:—

A device of the character described comprising a lure body, a reception channel mounted therein, a member detachably mounted in said reception channel and having means formed therewith designating an animated object, spaced apertures formed in said member, a groove formed in said member, an anchoring eye disposed through one of said apertures and having the ends thereof arranged to lie in the groove of said member, a cluster of hooks mounted in said anchoring eye, apertures in said lure body, a spring controlled plunger lock mounted in said lure body the end of the plunger of which is arranged to engage apertures in said reception channel and member to lock said member and cluster of hooks to said lure body, and a lug forming part of said member and being provided with an aperture to which the end of a line is attached.

FRANK J. KELLY.